United States Patent
Kim et al.

(10) Patent No.: US 8,320,510 B2
(45) Date of Patent: Nov. 27, 2012

(54) MMSE MIMO DECODER USING QR DECOMPOSITION

(75) Inventors: Youngjae Kim, Cupertino, CA (US); Je Woo Kim, Cupertino, CA (US); Jong Hyeon Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 779 days.

(21) Appl. No.: 12/211,884

(22) Filed: Sep. 17, 2008

(65) Prior Publication Data

US 2010/0067600 A1  Mar. 18, 2010

(51) Int. Cl.
H04B 7/10 (2006.01)
H04B 7/02 (2006.01)
H04B 7/216 (2006.01)

(52) U.S. Cl. .................. 375/347; 375/267; 370/335

(58) Field of Classification Search .................. 375/347, 375/260; 370/335
See application file for complete search history.

(56) References Cited

U.S. PATENT DOCUMENTS

| | | | |
|---|---|---|---|
| 6,600,796 B1 * | 7/2003 | Hassibi .................. | 375/347 |
| 7,292,647 B1 * | 11/2007 | Giannakis et al. ........... | 375/295 |
| 7,376,106 B2 * | 5/2008 | Ben-David et al. .......... | 370/335 |
| 2004/0100928 A1 * | 5/2004 | Ben-David et al. .......... | 370/335 |
| 2006/0062322 A1 | 3/2006 | Namgoong et al. | |
| 2006/0210070 A1 * | 9/2006 | Reznik et al. .................. | 380/33 |
| 2007/0280387 A1 * | 12/2007 | Li et al. ......................... | 375/347 |
| 2008/0198941 A1 * | 8/2008 | Song et al. .................... | 375/260 |

FOREIGN PATENT DOCUMENTS

WO WO2006138135 A2 12/2006
WO WO2006138135 A2 12/2006

OTHER PUBLICATIONS

Murugan A D et al., "A unified framework for tree search decoding: rediscovering the sequential decoder" Signal Processing Advances in Wireless Communications, 2005 IEEE 6th Workshop on New York, NY, USA Jun. 2-8, 2005, Piscataway, NJ, USA,IEEE, Jun. 2, 2005, pp. 761-765, XP010834629 ISBN: 978-0-7803-8867-3 Sections 2.1-2.2; p. 762-p. 763.

Sung-Jun Hwang et al., "Efficient Sequence Detection of Multi-Carrier Transmissions Over Doubly Dispersive Channels" Signal Processing Advances in Wireless Communications, 2006. SPAWC '06. IEEE 7th Workshop on, IEEE , Piscataway , NJ , USA, Jul. 1, 2006, pp. 1-5, XP031077974 ISBN: 978-0-7803-9710-1 Section 2.2. 1; p. 2-p. 3.

International Search Report and Written Opinion—PCT/US2009/032985—ISA/EPO—Nov. 11, 2009.

(Continued)

*Primary Examiner* — David C. Payne
*Assistant Examiner* — Sarah Hassan
(74) *Attorney, Agent, or Firm* — Tyler J. Overall

(57) ABSTRACT

Aspects of the disclosure provide unbiased channel equalization applied in a MIMO OFDM system with spatial multiplexing. According to certain embodiments, a MMSE receiver can be implemented with the QR decomposition (QRMMSE detection) instead of direct inversion of channel matrix by exploiting an augmented channel matrix. A simple and efficient bias removal technique is presented herein, whereby unbiased QRMMSE equalization may provide identical detection accuracy as a conventional unbiased MMSE approach. For certain embodiments, multiple access interference may be further reduced if the VBLAST version of the unbiased QRMMSE detection is applied.

16 Claims, 12 Drawing Sheets

OTHER PUBLICATIONS

Murugan A D et al., "A unified framework for tree search decoding: rediscovering the sequential decoder" Signal Processing Advances in Wireless Communications, 2005 IEEE 6TH Workshop on New York, NY, USA June 2-8, 2005, Piscataway, NJ, USA,IEEE, Jun. 2, 2005, pp. 761-765, XP010834629 ISBN: 978-0/7803-8867-3 Sections 2.1-2.2; p. 762-p. 763.

Sung-Jun Hwang et al., "Efficient Sequence Detection of Multi-Carrier Transmissions Over Doubly Dispersive Channels" Signal Processing Advances in Wireless Communications, 2006. SPAWC '06. IEEE 7TH Workshop on, IEEE , Piscataway , NJ , USA, Jul. 1, 2006, pp. 1-5, XP031077974 ISBN: 978-0/7803-9710-1 Section 2.2.1; p.2-p. 3.

Taiwan Search Report—TW098103596—TIPO-Mar. 26, 2012.

* cited by examiner

MMSE MIMO DECODER USING QR DECOMPOSITION

TECHNICAL FIELD

The present disclosure relates generally to a MIMO-OFDM communication systems, and more specifically to a technique for removing a bias in MMSE detection based on QR decomposition.

BACKGROUND

A multiple-input multiple-output (MIMO) communication system employs multiple ($N_t$) transmit antennas and multiple ($N_r$) receive antennas for data transmission. A MIMO channel formed by the $N_t$ transmit and $N_r$ receive antennas may be decomposed into $N_S$ independent channels, with $N_S \leq \min\{N_t, N_r\}$. Each of the $N_S$ independent channels is also referred to as a spatial subchannel of the MIMO channel and corresponds to a dimension. The MIMO system can provide improved performance (e.g., increased transmission capacity) over that of a single-input single-output (SISO) communication system if the additional dimensionalities created by the multiple transmit and receive antennas are utilized.

A wideband MIMO system typically experiences frequency selective fading, meaning different amounts of attenuation across the system bandwidth. This frequency selective fading causes inter-symbol interference (ISI), which is a phenomenon whereby each symbol in a received signal acts as distortion to subsequent symbols in the received signal. This distortion degrades performance by impacting the ability to correctly detect the received symbols. As such, ISI is a non-negligible noise component that may have a large impact on the overall signal-to-noise-and-interference ratio (SNR) for systems designed to operate at high SNR levels, such as MIMO systems. In such systems, channel equalization may be used at the receivers to combat ISI. However, the computational complexity required to perform equalization is typically significant or prohibitive for most applications.

Orthogonal frequency division multiplexing (OFDM) may be used to combat ISI without the use of computationally intensive equalization. An OFDM system effectively partitions the system bandwidth into a number of ($N_F$) frequency subchannels, which may be referred to as sub-bands or frequency bins. Each frequency subchannel is associated with a respective subcarrier frequency upon which data may be modulated. The frequency subchannels of the OFDM system may experience frequency selective fading (i.e., different amounts of attenuation for different frequency subchannels) depending on the characteristics (e.g., multipath profile) of the propagation path between transmit and receive antennas. With OFDM, the ISI due to the frequency selective fading may be combated by repeating a portion of each OFDM symbol (i.e., appending a cyclic prefix to each OFDM symbol), as is known in the art. A MIMO system may thus advantageously employ OFDM to combat ISI.

In order to increase the transmission data rate and spectral efficiency of the system, spatial multiplexing can be utilized at the transmitter where different and independent data streams are sent over a plurality of spatial subchannels. The detection accuracy at the receiver can be severely degraded due to a strong multiple access interference (interference of different data streams transmitted from a plurality of antennas). Furthermore, spatial and frequency subchannels of the MIMO-OFDM system may experience different channel conditions (e.g., different fading and multipath effects) and may achieve different SNRs. Moreover, the channel conditions may vary over time.

In order to successfully mitigate the multiple access interference, effects of noise and fading, the minimum mean square error (MMSE) channel equalization is typically applied at the receiver. However, an estimated signal obtained from the MMSE algorithm contains a bias which represents a self noise that degrades detection accuracy. It is well known in the art that MMSE technique can be simplified if a direct inversion of the channel matrix is replaced by the QR decomposition of an augmented channel matrix (hereinafter abbreviated as QRMMSE detection). However, a direct bias removal in this particular case is computationally complex. Furthermore, calculation of noise variance that is required for outer channel decoding may also be difficult.

There is therefore a need in the art for simpler and more efficient technique to remove a bias from a signal obtained after the MMSE equalization, which is proposed in this disclosure. The proposed scheme also provides substantially improved detection accuracy compare to a biased MMSE detection.

SUMMARY

Certain embodiments of the present disclosure provide a method for performing bias removal from a received signal obtained after minimum mean square error (MMSE) equalization in a wireless communication system. The method generally includes permuting an augmented matrix of channel estimates, for a plurality of spatial streams, to generate permuted augmented matrices of channel estimates for the plurality of spatial streams, performing QR decomposition of the permuted augmented matrices to generate a unitary matrix and an upper triangular matrix for the plurality of spatial streams, rotating a received signal of a first one of the spatial streams with a corresponding unitary matrix to generate a biased filtered output for the first spatial stream, and multiplying the biased filtered output with a diagonal element of a corresponding upper triangular matrix to generate unbiased filtered output for the first spatial data stream.

Certain embodiments of the present disclosure provide an apparatus for performing bias removal from a received signal obtained after minimum mean square error (MMSE) equalization in a wireless communication system. The apparatus generally includes logic for permuting an augmented matrix of channel estimates, for a plurality of spatial streams, to generate permuted augmented matrices of channel estimates for the plurality of spatial streams, logic for performing QR decomposition of the permuted augmented matrices to generate a unitary matrix and an upper triangular matrix for the plurality of spatial streams, logic for rotating a received signal of a first one of the spatial streams with a corresponding unitary matrix to generate a biased filtered output for the first spatial stream, and logic for multiplying the biased filtered output with a diagonal element of a corresponding upper triangular matrix to generate unbiased filtered output for the first spatial data stream.

Certain embodiments of the present disclosure provide an apparatus for performing bias removal from a received signal obtained after minimum mean square error (MMSE) equalization in a wireless communication system. The apparatus generally includes means for permuting an augmented matrix of channel estimates, for a plurality of spatial streams, to generate permuted augmented matrices of channel estimates for the plurality of spatial streams, means for performing QR decomposition of the permuted augmented matrices to generate a unitary matrix and an upper triangular matrix for the plurality of spatial streams, means for rotating a received signal of a first one of the spatial streams with a corresponding unitary matrix to generate a biased filtered output for the first spatial stream, and means for multiplying the biased filtered output with a diagonal element of a corresponding upper triangular matrix to generate unbiased filtered output for the first spatial data stream.

Certain embodiments of the present disclosure generally include a computer-program product for performing bias removal from a received signal obtained after minimum mean square error (MMSE) equalization in a wireless communication system, comprising a computer readable medium having instructions stored thereon, the instructions being executable by one or more processors. The instructions generally include instructions for permuting an augmented matrix of channel estimates, for a plurality of spatial streams, to generate permuted augmented matrices of channel estimates for the plurality of spatial streams, instructions for performing QR decomposition of the permuted augmented matrices to generate a unitary matrix and an upper triangular matrix for the plurality of spatial streams, instructions for rotating a received signal of a first one of the spatial streams with a corresponding unitary matrix to generate a biased filtered output for the first spatial stream, and instructions for multiplying the biased filtered output with a diagonal element of a corresponding upper triangular matrix to generate unbiased filtered output for the first spatial data stream.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.
Exemplary Wireless Communication System The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
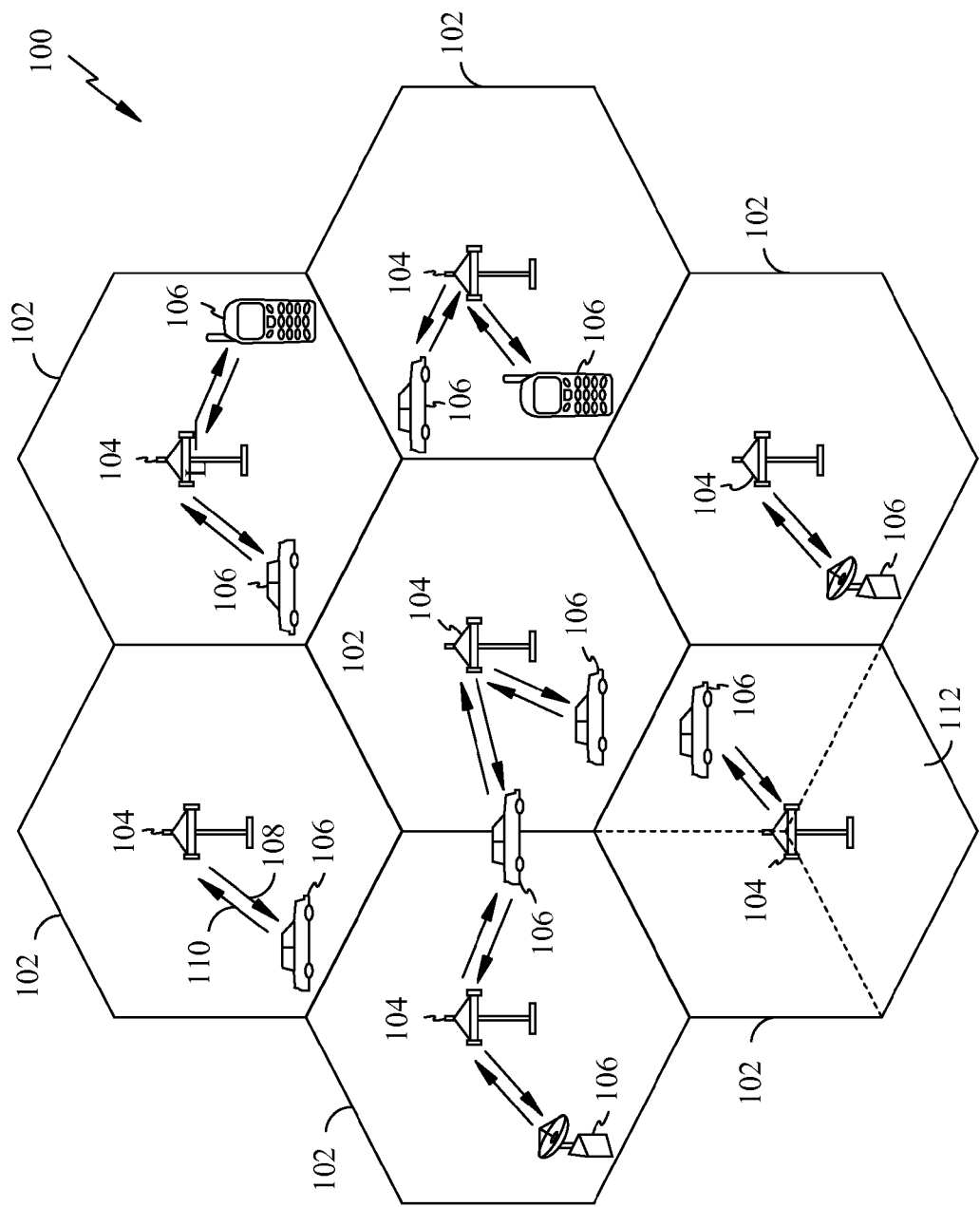
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
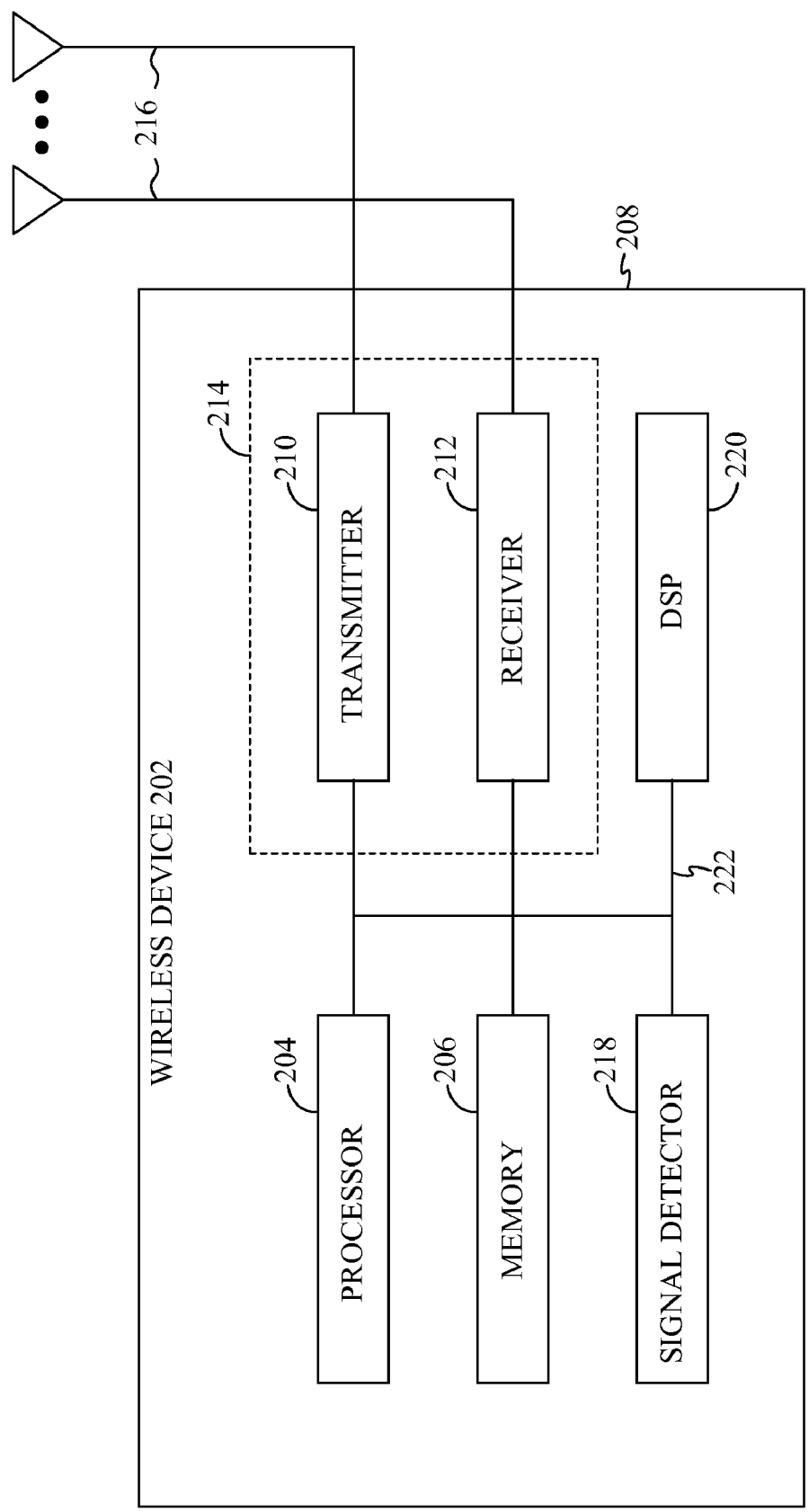
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
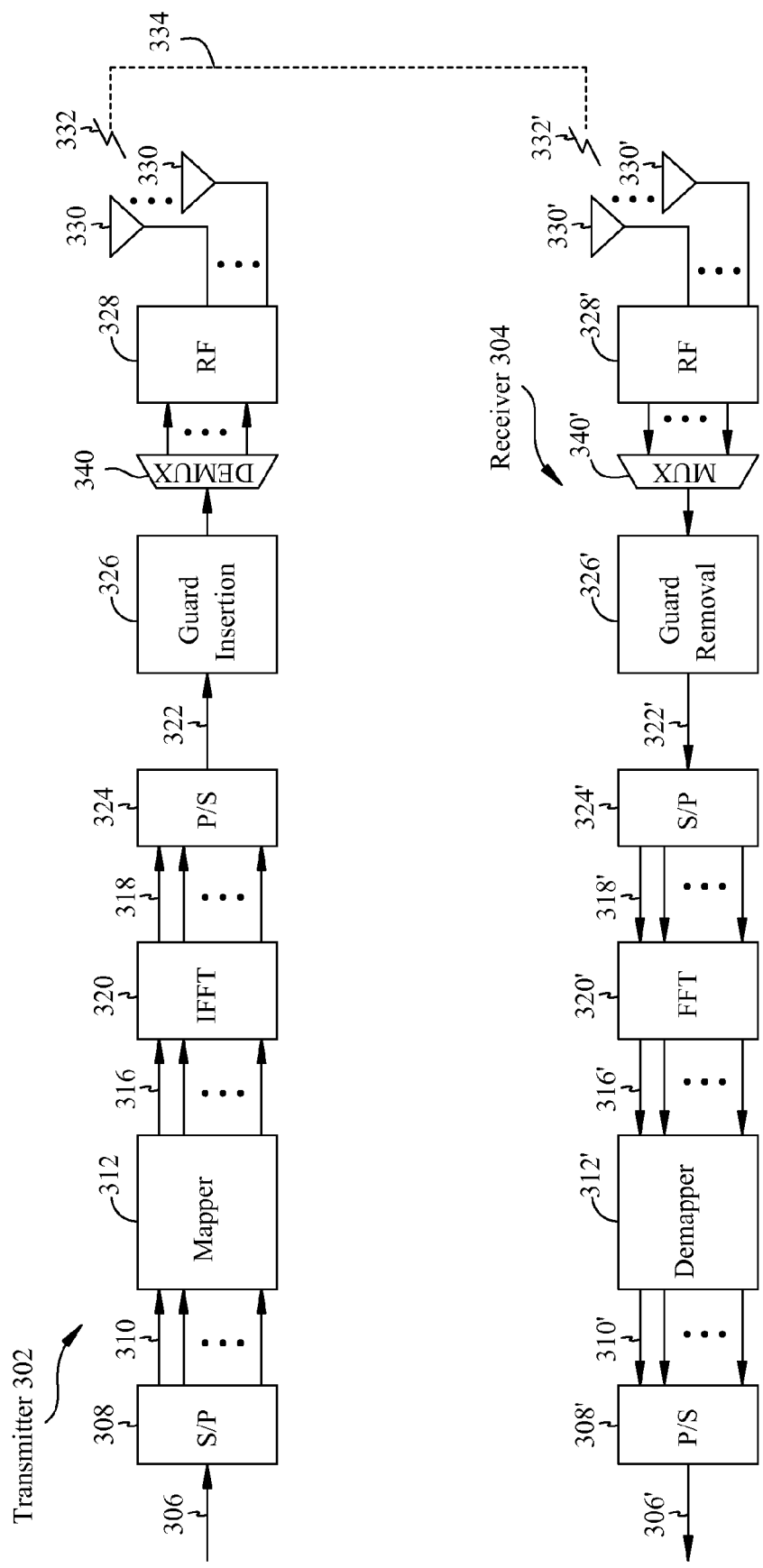
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, $N_s$, is equal to $N_{cp}$ (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The signal from the guard insertion component 326 may then be input into demultiplexer 340 to generate different data streams for a plurality of transmit antennas (or equivalently, spatial subchannels). After that, the base-band data stream for each antenna can be upconverted to a desired transmit frequency band by a radio frequency (RF) front end 328, and the antenna array 330 may then transmit the resulting signal 332 across multiple spatial subchannels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial subchannels 334. When a signal 332' is received by the antenna array 330', the received signal 332' may be downconverted to a baseband signal by an RF front end 328' and converted into a single stream by multiplexer 340'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 350'.

Exemplary MIMO-OFDM System Model

Figure 4:
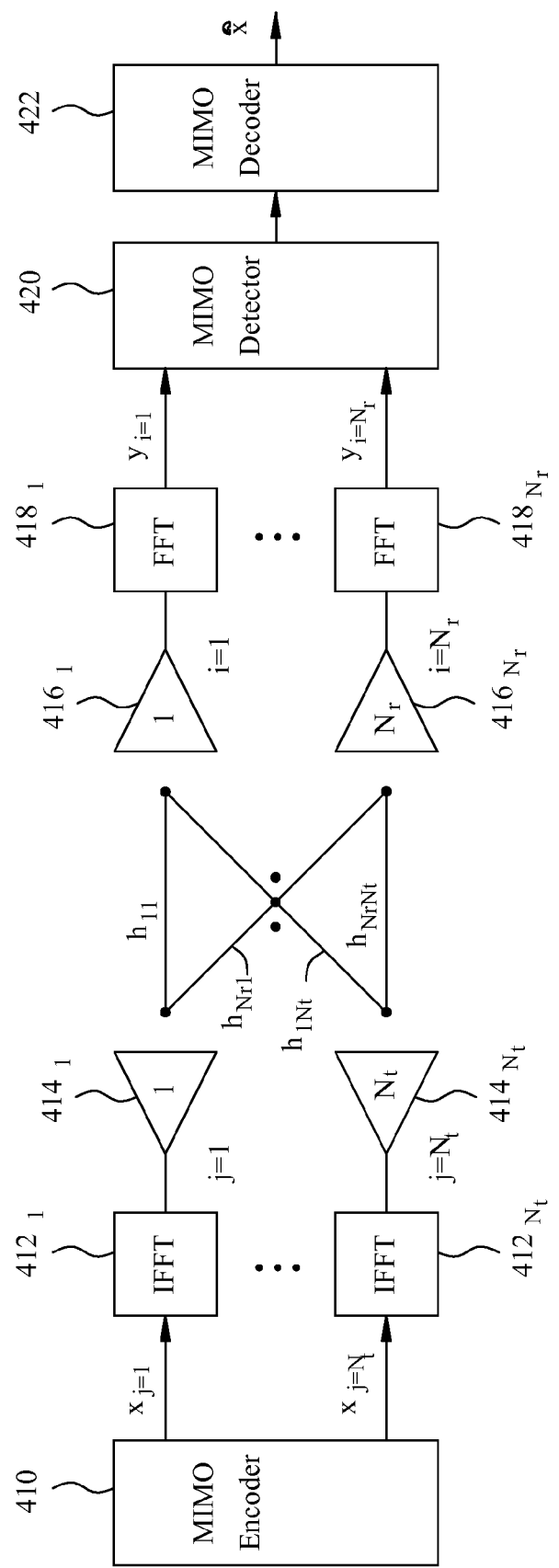
FIG. 4 illustrates a block diagram of a MIMO-OFDM wireless system used for deriving a system model.

FIG. 4 shows a block diagram of a generic multiple-input multiple-output (MIMO) OFDM wireless communication system with $N_t$ transmit and $N_r$ receive antennas. The system model for the $k^{th}$ sub-carrier (frequency subchannel) can be represented with linear equation:

$$y_k = H_k x_k + n_k, \; k=1, 2, \ldots, N_{\mathit{fft}} \tag{1}$$

where $N_{\mathit{fft}}$ is the number of orthogonal sub-carriers (frequency bins) in a MIMO wireless system.

In equations and accompanying disclosure below, the sub-carrier index k is omitted for simplicity. Therefore, the system model can be re-written in the simple notation as:

$$y = Hx + n \tag{2}$$

$$y = [y_1 \; y_2 \; \ldots \; y_{N_r}]^T \tag{3}$$

$$H = [h_1 \; h_2 \; \ldots \; h_{N_t}] = \begin{bmatrix} h_{11} & h_{12} & \ldots & h_{1N_t} \\ & \ldots & & \\ h_{N_r 1} & h_{N_r 2} & \ldots & h_{N_r N_t} \end{bmatrix} \tag{4}$$

$$x = [x_1 \; x_2 \; \ldots \; x_{N_t}]^T \tag{5}$$

$$n = [n_1 \; n_2 \; \ldots \; n_{N_r}]^T \tag{6}$$

where y is $[N_r \times 1]$ received symbol vector, H is $[N_r \times N_t]$ channel matrix and $h_j$ is its $j^{th}$ column vector that contains channel gains between the transmit antenna j and all $N_r$ receive antennas, x is $[N_t \times 1]$ transmitted symbol vector, n is $[N_r \times 1]$ complex noise vector with covariance matrix $E(nn^H)$.

As illustrated in FIG. 4, the transmission signal may be first encoded by MIMO encoder 410. A redundancy may be included to protect the information data during the transmission over noisy wireless channels. An encoded signal can then be split into $N_t$ spatial data streams $x_1, x_2, \ldots, x_{Nt}$, as shown in FIG. 4. A plurality of spatial data streams can be converted into a time domain by utilizing Inverse Fast Fourier Transform (IFFT) units $412_1, \ldots, 412_{Nt}$. The signal may then be up converted to a desired transmission frequency band and transmitted from $N_t$ transmit antennas $414_1, \ldots, 414_{Nt}$ over $N_r \cdot N_t$ spatial subchannels.

$N_r$ receive antennas $416_1, \ldots, 416_{Nr}$ are employed at the receiver. Received data streams can be converted back into a frequency domain by using the Fast Fourier Transform (FFT) units $418_1, \ldots, 418_{Nr}$. A frequency domain signal may be input into a MIMO detector 420 that generates reliability messages for coded bits transmitted over a plurality of spatial subchannels. A reliability message represents a probability that the particular transmitted coded bit is either bit "0" or bit "1". This information can be passed to the outer MIMO channel decoder 422, and the estimated information data $\hat{x}$ for a plurality of spatial subchannels (transmit antennas) are available after removing the redundancy included at the transmitter.

Exemplary Linear MMSE Detection

In a well known linear MMSE detector (channel equalizer), $G_{MMSE}$ can be represented in the following form:

$$G_{MMSE} = (H^H H + \sigma_n^2 I_{N_t})^{-1} H^H \tag{7}$$

where $\sigma_n^2$ is the variance of noise at the receiver, and $I_{N_t}$ is the identity matrix of size $[N_t \times N_t]$. A signal obtained after applying the MMSE filtering may be expressed as:

$$\tilde{y} = G_{MMSE} y = (H^H H + \sigma_n^2 I_{N_t})^{-1} H^H y \tag{8}$$

Figure 5:
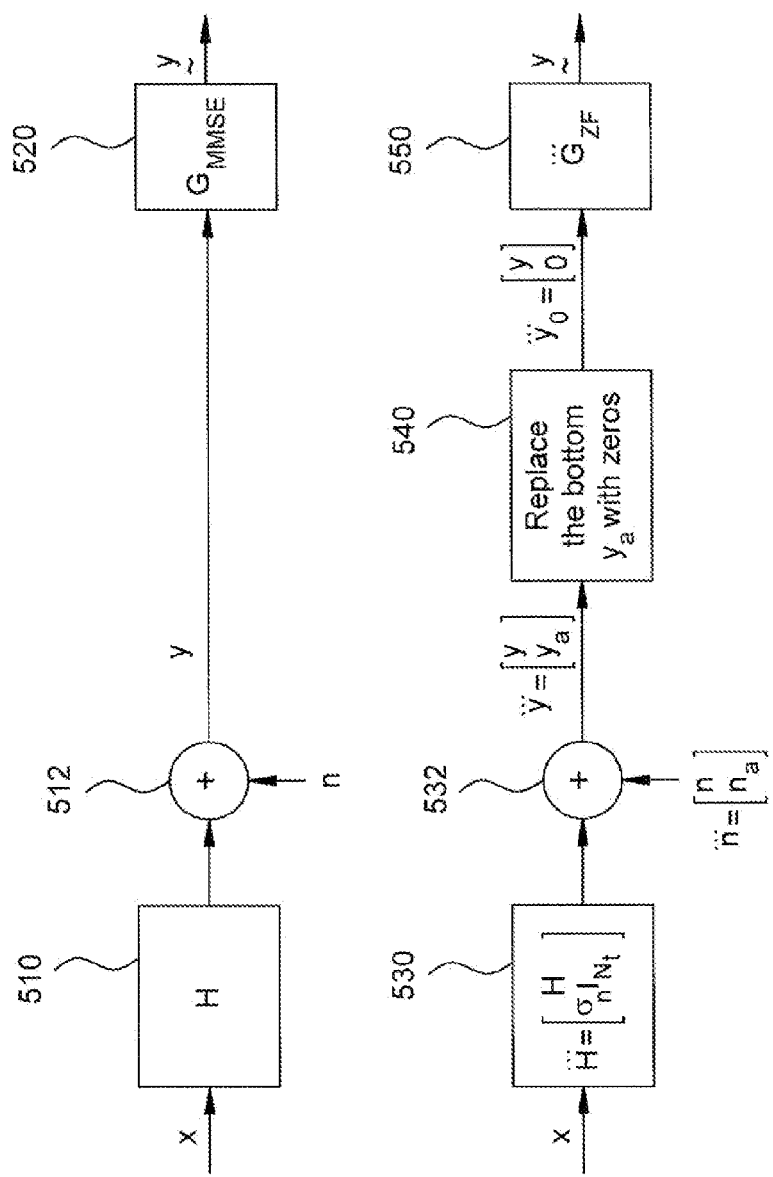
FIG. 5 shows a block diagram that illustrates equivalence between an MMSE equalization of original channel and a zero-forcing (ZF) equalization of an augmented channel.

The linear system model described by equation (2) is illustrated in FIG. 5. Transmission of signal x over a plurality of spatial subchannels using a particular frequency subchannel is illustrated with block 510, and the effect of channel noise at the receiver is represented with adder 512. The MMSE filtering is then applied on the received symbol vector y as illustrated by block 520.

The error covariance matrix of the MMSE channel equalization is equal to:

$$C_a = E\{(\tilde{y}-x)(\tilde{y}-x)^H\} = \sigma_n^2 (H^H H + \sigma_n^2 I_{N_t})^{-1} \tag{9}$$

The system model with augmented channel $\ddot{H}$, which is also illustrated in FIG. 5 may be defined as:

$$\ddot{y} = \ddot{H} x + \ddot{n}, \text{ where } \ddot{H} = \begin{bmatrix} H \\ \sigma_n I_{N_t} \end{bmatrix} \tag{10}$$

is an augmented channel matrix (unit 530), $$\ddot{y} = \begin{bmatrix} y \\ y_a \end{bmatrix}$$

is an augmented received signal vector, $$\ddot{n} = \begin{bmatrix} n \\ n_a \end{bmatrix}$$

is an augmented complex noise vector added to the received vector (illustrated with adder 532), $\ddot{H}$ is $[(N_r + N_t) \times N_t]$, $\ddot{y}$ is $[(N_r + N_t) \times 1]$, x is $[N_t \times 1]$, and $\ddot{n}$ is $[(N_r + N_t) \times 1]$.

It can be shown that a zero-forcing (ZF) equalizer of the augmented channel $\ddot{H}$ is equivalent to the MMSE equalization of the original channel H. The ZF equalizer of the augmented channel can be defined as:

$$\ddot{G}_{ZF} = (\ddot{H}^H \ddot{H})^{-1} \ddot{H}^H \tag{11}$$

$$= \left( [H^H \; \sigma_n I_{N_t}] \begin{bmatrix} H \\ \sigma_n I_{N_t} \end{bmatrix} \right)^{-1} [H^H \; \sigma_n I_{N_t}]$$

$$= (H^H H + \sigma_n I_{N_t})^{-1} [H^H \; \sigma_n I_{N_t}]$$

If the augmented portion $y_a$ in $\ddot{y}$ is replaced with zeros (unit 540), i.e., $$\ddot{y}_0 = \begin{bmatrix} y \\ 0 \end{bmatrix} \quad (12)$$

then, the following equality holds after the ZF equalization (unit 550):

$$\ddot{G}_{ZF}\ddot{y}_0 = G_{MMSE}y = (H^H H + \sigma_n^2 I_{N_t})^{-1} H^H y. \quad (13)$$

After comparing equation (13) and equation (8), it can be concluded that the ZF equalization of the augmented channel matrix $\ddot{H}$ is equivalent to the MMSE equalization of the original matrix H. FIG. 5 illustrates equivalence of these two approaches where the filtered outputs y from equations (8) and (13) may be identical.

Rotation of the received signal with a unitary matrix $Q^H$ (Hermitian version of a unitary matrix obtained from the QR decomposition of the original channel matrix) results in the same signal that is generated with the ZF equalization. Therefore, the algorithmic equivalence illustrated in FIG. 5 may lead to the fact that the MMSE detection can be implemented with QR decomposition of an augmented channel matrix.

Exemplary Unbiased MMSE Detection using QR Decomposition

Figure 6:
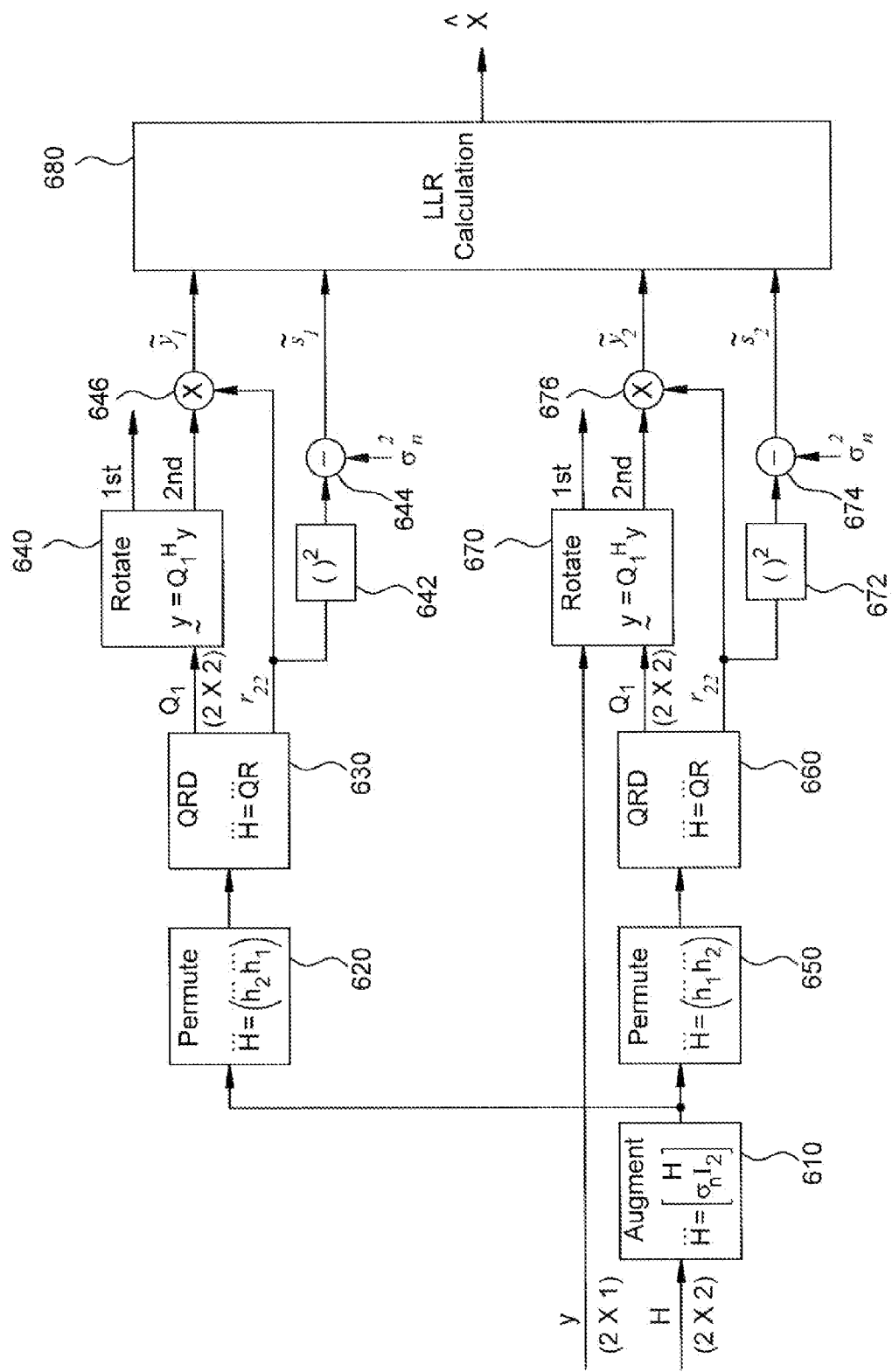
FIG. 6 illustrates an example block diagram of QRMMSE detection with a bias removal applied in a MIMO-OFDM system with two transmit and two receive antennas.

To illustrate the MMSE detection based on QR decomposition (QRMMSE detection), it may be described without losing a generality, a wireless system with two transmit antennas. An example block diagram of a MIMO receiver that performs QRMMSE detection of two spatial data streams transmitted over two spatial subchannels (pair of transmit antennas) is shown in FIG. 6.

The channel matrix is first augmented (unit 610), and then its columns are permuted such that the last column of the resultant permuted matrix corresponds to the spatial subchannel (spatial data stream) that is currently being decoded. In the illustrated example, permutation units 620 and 650 in FIG. 6 are applied for decoding of the first and second spatial data streams, respectively. The QR decomposition of permuted channel matrices may be performed by units 630 and 660 for decoding of the first and second spatial data stream, respectively.

The QR decomposition of an augmented channel matrix may be represented as:

$$\ddot{H} = \begin{bmatrix} H \\ \sigma_n I_{N_t} \end{bmatrix} = \ddot{Q}R = \begin{bmatrix} Q_1 \\ Q_2 \end{bmatrix} R = \begin{bmatrix} Q_1 R \\ Q_2 R \end{bmatrix}, \quad (14)$$

where matrix $\ddot{Q}$ ($\in C^{(N_r+N_t) \times N_t}$) consists of orthonormal column vectors and $R (\in C^{N_t \times N_t})$ is an upper triangular matrix with real numbered diagonal elements. From equation (14) it follows that:

$$\sigma_n I_{N_t} = Q_2 R \quad (15)$$

$$Q^H H = [Q_1^H \; Q_2^H] \begin{bmatrix} H \\ \sigma_n I_{N_t} \end{bmatrix} = Q_1^H H + \sigma_n Q_2^H = R \quad (16)$$

$$Q_1^H H = R - \sigma_n Q_2^H \quad (17)$$

where $Q_1$ is $[N_r \times N_t]$ and $Q_2$ is $[N_t \times N_t]$.

As shown by equation (13), instead of performing MMSE equalization of the original channel matrix, a zero-forcing (ZF) operation can be applied on the augmented channel matrix. Units 640 and 670 in FIG. 6 perform zero-forcing filtering (rotation) of the received vector y, and the result is biased filtered output for the first and second spatial data stream, respectively. It can be observed from equation (12) that only an upper half of unitary matrix Q (matrix $Q_1$ from equation (14)) may be required to rotate the received symbol vector y. The filtered output with a bias introduced by the MMSE operation may, therefore, be expressed as:

$$y = Q_1^H y = Q_1^H (Hx+n) = Q_1^H Hx + Q_1^H n \quad (18)$$

From equation (17), it follows that:

$$y = (R - \sigma_n Q_2^H)x + Q_1^H n \quad (19)$$

For an exemplary MIMO-OFDM system with two transmit and two receive antennas the following expressions can be specified:

$$x = \begin{bmatrix} x_1 \\ x_2 \end{bmatrix}, Q_1 = \begin{bmatrix} p_1 & q_1 \\ p_2 & q_2 \end{bmatrix}, Q_2 = \begin{bmatrix} p_3 & q_3 \\ 0 & q_4 \end{bmatrix}, \quad (20)$$

$$n = \begin{bmatrix} n_1 \\ n_2 \end{bmatrix}, R = \begin{bmatrix} r_{11} & r_{12} \\ 0 & r_{22} \end{bmatrix}.$$

As an illustrative example, decoding of the second spatial data stream $x_2$ may be considered. Because of equality (15) the matrix $Q_2$ is upper triangular. Therefore equation (19) can be rewritten as:

$$\begin{bmatrix} y_1 \\ y_2 \end{bmatrix} = \begin{bmatrix} (r_{11} - \sigma_n p_3^*)x_1 + r_{12}x_2 + p_1^* n_1 + p_2^* n_2 \\ (r_{22} - \sigma_n p_4^*)x_2 + \sigma_n q_3^* x_1 + q_1^* n_1 + q_2^* n_2 \end{bmatrix} \quad (21)$$

The term $(r_{11} - \sigma_n p^*_3)$ represents the bias on the signal transmitted from the first antenna (first spatial data stream), and the term $(r_{22} - \sigma_n q^*_4)$ represents the bias on the signal transmitted from the second antenna (second spatial data stream).

As an example, it is first considered removing a bias from the second spatial data stream. In one embodiment a bias may be removed by dividing the second biased data stream with the bias term $(r_{22} - \sigma_n q^*_4)$. However, division is not a desirable arithmetic operation for efficient hardware implementation due to a long latency and large area size of divider. Also, division operation may generate a very complex noise plus interference terms that prevents accurate calculation of noise variance, which is required for the calculation of log-likelihood ratios (LLRs) of coded bits. Instead of a conventional bias removal approach based on direct division operation, a simpler bias removal technique is proposed in the present disclosure.

If the second row of equation (21) is multiplied with the last diagonal element $r_{22}$ of an upper triangular matrix R (illustrated with multipliers 676 and 646 in FIG. 6 for decoding of the second and first spatial stream, respectively), the unbiased filtered output for the second spatial stream may be obtained from the following equation:

$$\tilde{y}_2 = (r_{22}^2 - \sigma_n r_{22} q^*_4)x_2 + r_{22}(-\sigma_n q^*_3 x_1 + q^*_1 n_1 + q^*_2 n_2) = h_{eff} x_2 + n_{eff} \quad (22)$$

Since from equation (15) $r_{22}q_4 = \sigma_n$ (element $q_4$ is a real number), the effective channel for the second spatial data stream may be obtained from the following equation:

$$h_{eff} = r_{22}^2 - \sigma_n r_{22} q^*_4 = r_{22}^2 - \sigma_n^2 = \tilde{s}_2 \quad (23)$$

Computation of the effective subchannel that corresponds to the second spatial stream is illustrated in FIG. 6 by applying the square multiplier 672 on the last diagonal element $r_{22}$ of matrix R, and the subtraction unit 674. A similar processing flow can be applied for the computation of effective channel that corresponds to the first spatial data stream, which is represented with the square multiplier 642 and the subtraction unit 644.

Regarding the noise variance, since $E[x_2 x^*_2]=1$ and the transmission signal $x_2$ is independent from the noise components related to the first and second spatial subchannels, the variance of the effective noise that corresponds to the second spatial subchannel may be computed as:

$$\sigma_{n_{eff}}^2 = r_{22}^2(\sigma_n^2 q_3^2) + r_{22}^2(q_1^2+q_2^2)\sigma_n^2 \quad (24)$$

From equation (14) it can be observed that $q_1^2+q_2^2+q_3^2+q_4^2=1$. Then equation (24) becomes:

$$\begin{aligned}
\sigma_{n_{eff}}^2 &= r_{22}^2 \sigma_n^2 (q_3^2 + q_1^2 + q_2^2) \\
&= r_{22}^2 \sigma_n^2 (1 - q_4^2) \\
&= \sigma_n^2 (r_{22}^2 - r_{22}^2 q_4^2) \\
&= \sigma_n^2 (r_{22}^2 - \sigma_n^2) \\
&= \sigma_n^2 h_{eff}
\end{aligned} \quad (25)$$

After the bias is removed, the effective signal model for the second spatial subchannel is:

$$\tilde{y}_2 = h_{eff} x + n_{eff} \text{ with } h_{eff} = r_{22}^2 - \sigma_n^2 \text{ and } \sigma_{n_{eff}}^2 = \sigma_n^2 h_{eff} \quad (26)$$

The log likelihood ratios (LLRs) for the coded bits that correspond to the second spatial subchannel can be calculated by utilizing $\tilde{y}_2$, $\tilde{s}_2 = h_{eff}$ and $\sigma_{n_{eff}}^2$ as it is illustrated with unit 680 in FIG. 6. The signal model for calculation of LLRs for the second data stream is:

$$\tilde{y}_2 = \tilde{s}_2 x_2 + \sqrt{\tilde{s}_2}\, n_2, \quad (27)$$

where $n_2 \sim N(0, \sigma_n^2)$ and $\tilde{s}_2 = r_{22}^2 - \sigma_n^2$. Computation of LLRs for coded bits that belong to the first spatial data stream can be performed in the similar manner, which is also illustrated in FIG. 6 where signals $\tilde{y}_1$ and $\tilde{s}_1 = h_{eff}$ are input into the LLR calculation unit 680.

If the pre-whitening is applied on channel estimates and on received samples, the effective noise variance at the receiver becomes unitary ($\sigma_n^2=1$) and it is not required to be calculated. The signal model for the computations of LLRs that correspond to the second spatial data stream now becomes:

$$\tilde{y}_2 = \tilde{s}_2 x_2 + \sqrt{\tilde{s}_2}\, n_2, \quad (28)$$

where $n_2 \sim N(0,1)$ and $\tilde{s}_2 = r_{22}^2 - 1$. It can be observed from FIG. 6 that identical implementation logic can be used for detection of any spatial data stream because of the appropriate permutation of channel matrix.

Figure 7:
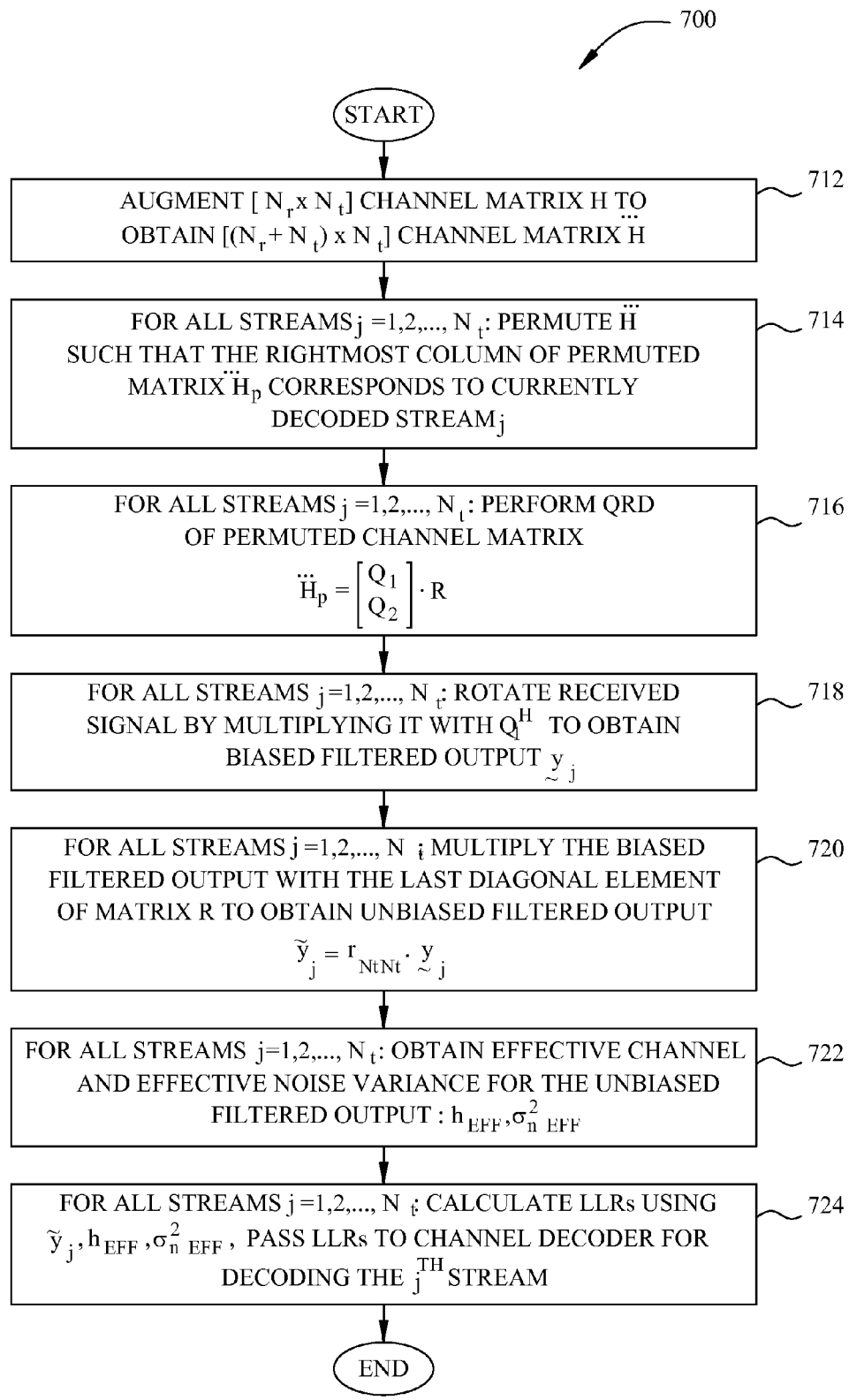
FIG. 7 shows a process of QRMMSE detection with a bias removal applied in a MIMO-OFDM system.

The process of decoding spatial data streams using the QRMMSE detection can be generalized for a system with $N_t$ transmit antennas (spatial subchannels) as shown by flow diagram in FIG. 7. The $[N_r \times N_t]$ channel matrix H is first augmented as in equation (14) and $[(N_r+N_t) \times N_t]$ channel matrix $\ddot{H}$ is obtained, at 712. Following that, the augmented channel matrix $\ddot{H}$ can be permuted, at 714, for every spatial data streams $j=1, 2, \ldots, N_t$ such that the rightmost column of permuted matrix $\ddot{H}_P$ corresponds to the $j^{th}$ decoded stream:

$$\ddot{H}_P = [\ddot{h}_{p(1)}\ \ddot{h}_{p(2)} \ldots \ddot{h}_{p(N_t-1)}\ \ddot{h}_{p(N_t)=j}] \quad (29)$$

The QR decomposition of permuted and augmented channel matrix defined by equation (29) may then be conducted for every spatial data stream $j=1, 2, \ldots, N_t$, such that $$\ddot{H}_P = \begin{bmatrix} Q_1 \\ Q_2 \end{bmatrix}.$$

R, at 716. After that, for every spatial data stream $j=1, 2, \ldots, N_t$, the received signal vectory can be rotated by multiplying it with a corresponding Hermitian version of unitary matrix $Q_1$ (matrix $Q_1^H$), which is an upper half of unitary matrix obtained from the QR decomposition of permuted and augmented matrix $\ddot{H}_P$. As a result of this rotation, the biased filtered output may be obtained for every spatial data stream according to equation (18), at 718.

For every spatial data stream $j=1, 2, \ldots, N_t$, the last element of the biased filtered output may be multiplied with the last diagonal element $r_{N_tN_t}$ of upper triangular matrix R to obtain the unbiased filtered output $\tilde{y}_j$ for the $j^{th}$ data stream, at 720. Following this, for every spatial data stream $j=1, 2, \ldots, N_t$, the effective channel and the effective noise variance can be obtained, at 722, as:

$$h_{eff} = r_{N_tN_t}^2 - \sigma_n^2 \text{ and } \sigma_{n_{eff}}^2 = \sigma_n^2 h_{eff}. \quad (30)$$

The unbiased filtered output for the $j^{th}$ spatial data stream can be therefore represented as:

$$\tilde{y}_j = h_{eff} x_j + n_{eff} \quad (31)$$

The resulting signal model for the $j^{th}$ spatial subchannel now becomes:

$$\tilde{y}_j = h_{eff} x_j + \sqrt{h_{eff}}\, n_j,\ n_j \sim N(0,\sigma_n^2), j=1, \ldots, N_t \quad (32)$$

According to this signal model, LLRs of coded bits for each spatial data stream $j=1, 2, \ldots, N_t$ can be calculated by using $\tilde{y}_j$, $h_{eff}$ and $\sigma_{n_{eff}}$, at 724. Computed LLRs may be passed to the outer channel decoder for estimation of all $N_t$ spatial data streams.

Figure 8:
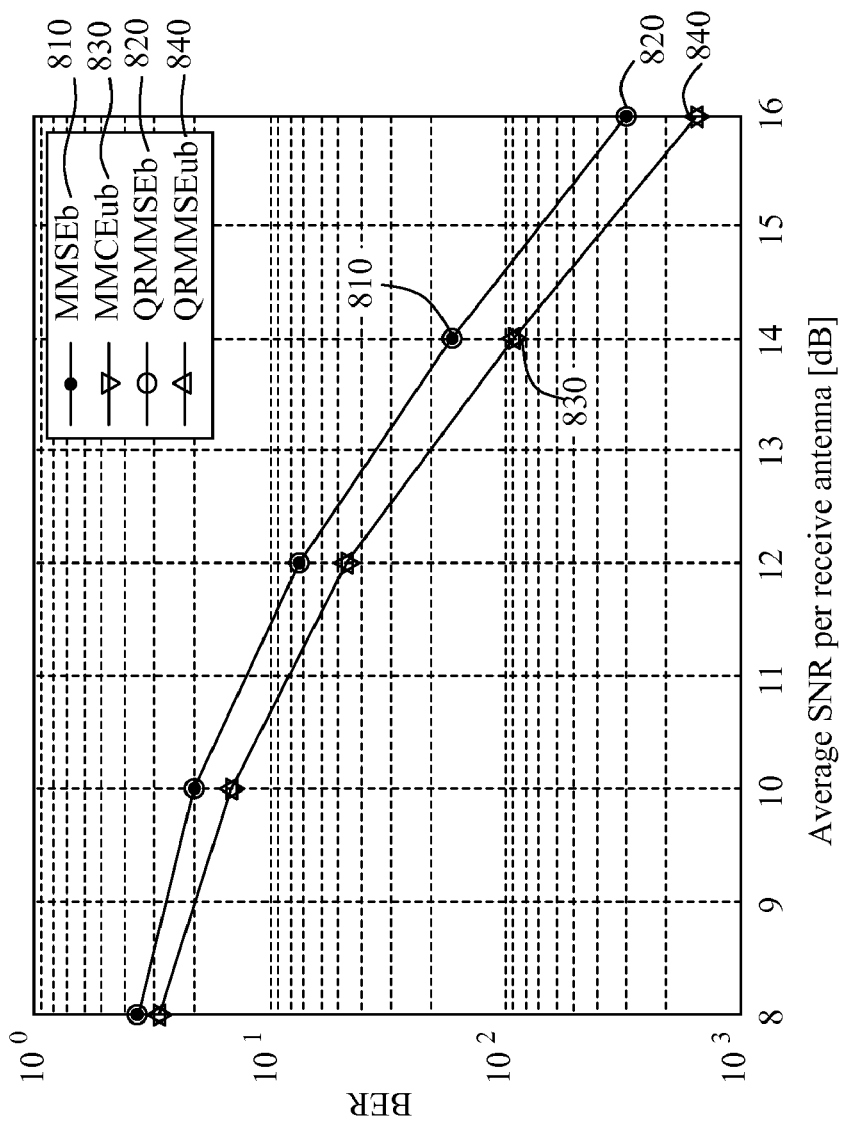
FIG. 8 is a graph of bit-error-rate performance of conventional MMSE detection (biased and unbiased) and QRMMSE detection (biased and unbiased).

The unbiased QRMMSE algorithm is equivalent to the conventional unbiased MMSE approach in terms of detection accuracy. FIG. 8 shows a graph of bit error rate (BER) performance for biased and unbiased conventional MMSE equalization versus biased and unbiased QRMMSE equalization. Simulations are performed for a wireless system with two transmit and two receive antennas, 16-QAM modulation is applied at the transmitter, convolutional code of rate ½ is used, and the Channel D fading model is assumed.

A curve 810 in FIG. 8 represents BER performance for biased conventional MMSE detection, a curve 820 represents BER performance for biased QRMMSE detection, a curve 830 represents BER performance for unbiased conventional MMSE detection, and a curve 840 represents BER performance for QRMMSE detection with proposed bias removal technique. It can be observed the same BER results of conventional biased MMSE and biased QRMMSE detection algorithms. The substantial BER performance improvement can be achieved if the bias term is removed from the QRMMSE filtered output based on a technique proposed in this disclosure (curve 840 versus curve 820 in FIG. 8).

An advanced MIMO receiver may be equipped with QR decomposition logic for a multi-stream detection. When the user equipment is on the verge of two cells (e.g. during the soft hand-over process), a multi-stream detection may not be as effective as it is within the cell, where a simple MMSE operation performs better. In this case, the receiver may switch to the MMSE detection in order to improve the error rate performance. By applying the proposed bias removal technique, the QRMMSE receiver may be efficiently implemented by using the QR decomposition logic.

As presented herein, one feature of the proposed unbiased QRMMSE equalization is a simple bias removal technique. This approach is less complex than the conventional bias removal algorithm based on a division operation, and a substantial improvement of error rate performance may be achieved.

Exemplary QRMMSE-VBLAST Receiver

The well-known Vertical-Bell Laboratories-Layered-Space-Time (VBLAST) approach may be combined with the QRMMSE detection (hereinafter abbreviated as VBLAST-QRMMSE). The principle of the VBLAST algorithm is to decode the most reliable signal first among multiple spatial data streams, typically the one with the highest signal-to-noise ratio (SNR). Then, the decoded signal may be subtracted (canceled) from all biased spatial signals obtained after QRMMSE and, therefore, new signals may be generated with a reduced multiple access interference. The procedure of decoding and cancelation can be repeated for all utilized spatial subchannels in the communication system.

Figure 9:
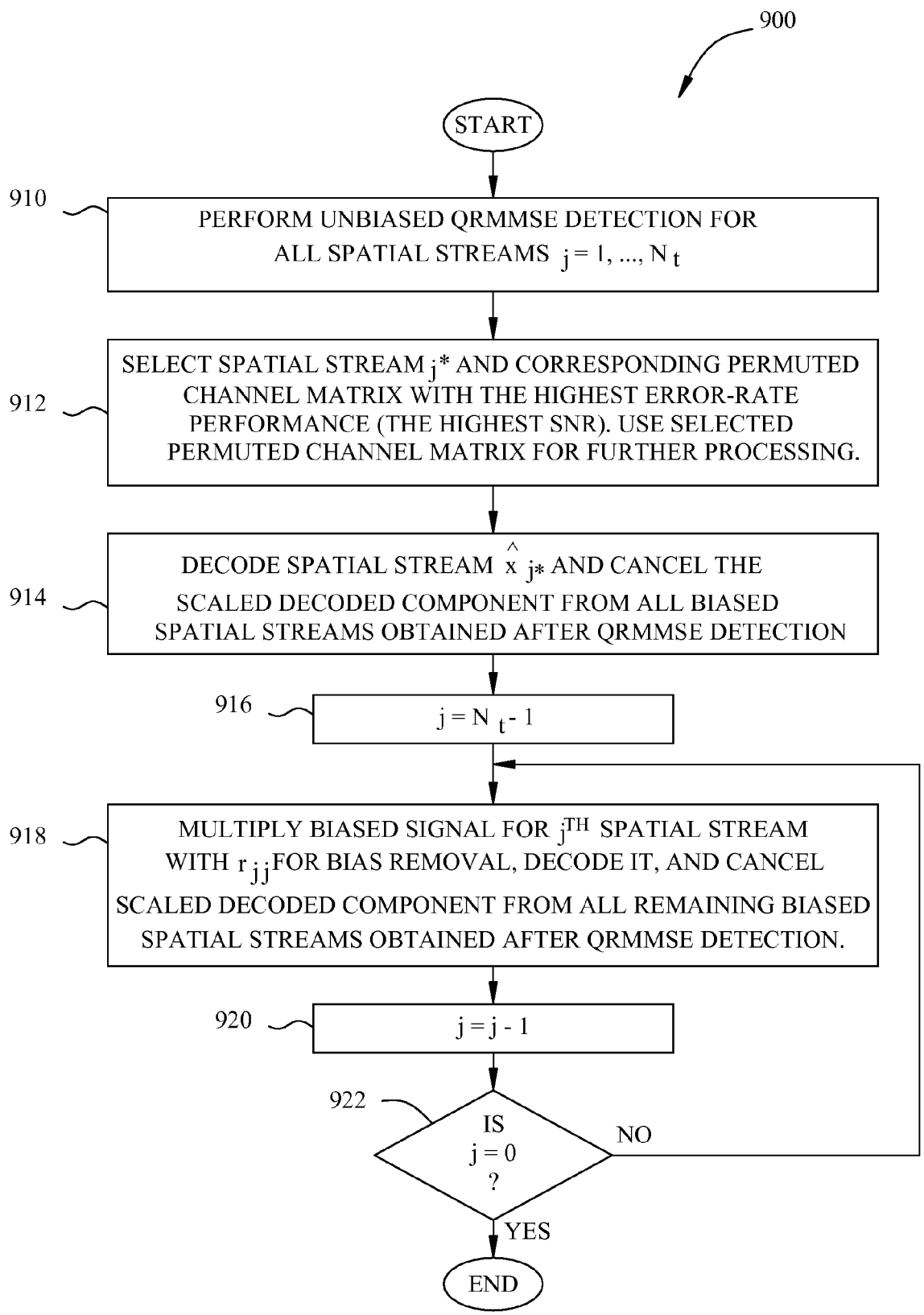
FIG. 9 shows a process of QRMMSE-VBLAST detection with a bias removal applied in a MIMO-OFDM system.

FIG. 9 shows a process of estimating $N_t$ spatial data streams by utilizing the VBLAST based QRMMSE detection. At 910, the previously described unbiased QRMMSE detection may be applied for all utilized spatial data streams j=1, . . . , $N_t$. After that, at 912, the spatial data stream j* and its corresponding permuted channel matrix defined by equation (29) may be selected, such that this particular spatial stream provides the best error rate performance among all $N_t$ spatial streams. Selected spatial data stream j* typically corresponds to a spatial sub-channel with the highest SNR. The permuted channel matrix that corresponds to a selected spatial data stream j* may be utilized for further processing. Spatial data stream $x_j$* may be decoded, at 914, and the scaled decoded component may be cancelled from all biased spatial data streams obtained based on biased QRMMSE. For certain embodiments of the present disclosure it may be assumed, without losing generality, that j*=$N_t$.

For the best performance, remaining $N_t$−1 spatial data streams should be decoded in the order from the most to the least reliable spatial stream. This requires repeating the selection procedure from 912, which includes searching for the best permutation matrix among all spatial streams that are not yet decoded. Instead, the matrix found at 912 may be used until all data streams are decoded. This method is illustrated in FIG. 9. Since the $N_t^{th}$ data stream is already decoded and subtracted at 912 and 914, the data stream index j may start at $N_t$−1. The biased signal that corresponds to the currently decoded spatial data stream j may be multiplied, at 918, by the $j^{th}$ diagonal element $r_{jj}$ of the upper triangular matrix R for the purpose of bias removal. The upper triangular matrix R may be obtained as a result of the QR decomposition of the selected permuted channel matrix at 912. Following the bias removal, just like the $N_t^{th}$ data stream was decoded and canceled at 914, the $j^{th}$ spatial data stream may be decoded and then be subtracted (canceled) from all remaining biased spatial data streams. This decoding process may be repeated $N_t$−1 times corresponding to the number of remaining spatial data streams to be decoded (steps 918 through 924 in FIG. 9 may be repeated $N_t$−1 times).

Figure 10:
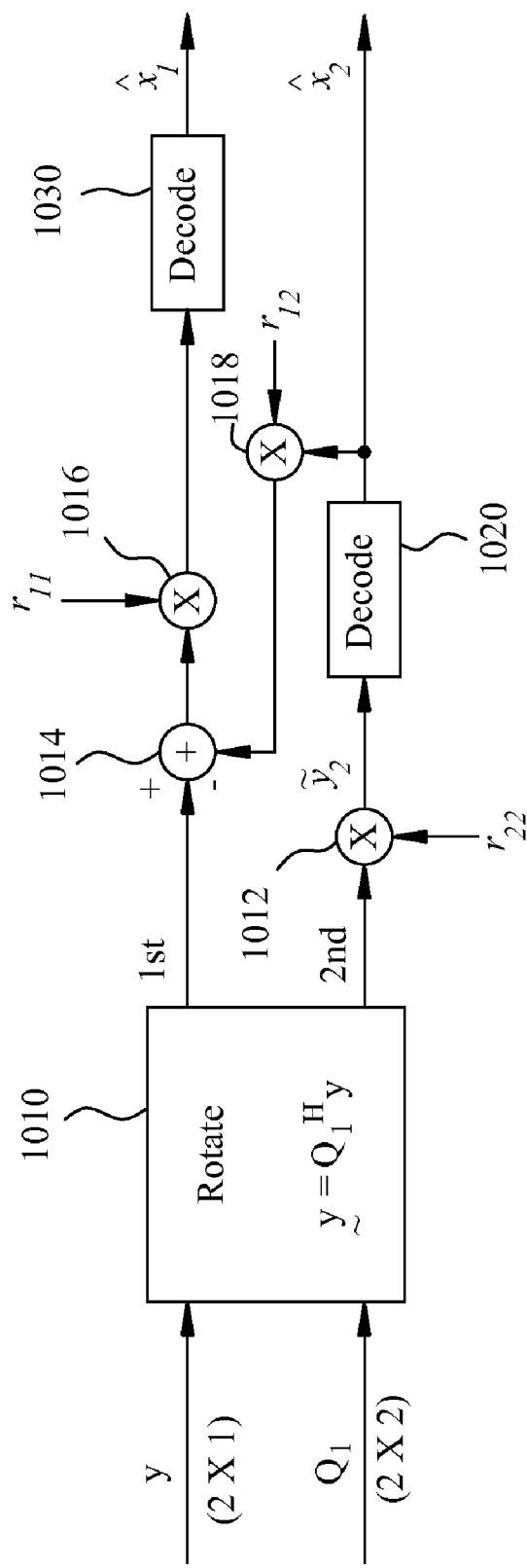
FIG. 10 illustrates an example block diagram of QRMMSE-VBLAST detection with a bias removal applied in a MIMO-OFDM system with two transmit and two receive antennas.

As an illustrative example, the QRMMSE-VBLAST detection algorithm can be utilized for a MIMO-OFDM system with two transmit antennas (decoding of two spatial data streams). An example block diagram of such a QRMMSE-VBLAST receiver for detection of two spatial data streams is shown in FIG. 10.

The QRMMSE operation may be applied by unit 1010 to generate biased signals for both spatial sub-channels. For this exemplary case, it may be assumed that the second spatial data stream is more reliable, and therefore may be decoded first.

The unbiased filtered output for the second data stream $\tilde{y}_2$ can be obtained in unit 1012 by multiplying the biased filtered output with the last diagonal element $r_{22}$ of an upper triangular matrix R that is generated after the QR decomposition of the augmented channel matrix from equation (14). The LLRs of coded bits that correspond to the second spatial data stream can be obtained by using the unbiased filtered output $\tilde{y}_2$, the effective channel that corresponds to the second spatial stream $h_{eff}=r_{22}^2-\sigma_n^2$, and the effective noise variance that corresponds to the second spatial subchannel: $\sigma_{n_{eff}}^2=\sigma_n^2 h_{eff}$. The LLRs are then used by the channel decoder 1020 to obtain the estimated second spatial data stream $\hat{x}_2$.

The estimated second spatial data stream $\hat{x}_2$ can be cancelled from the biased signal in the first row of equation (21) if the estimated signal is scaled in multiplier 1018 with element $r_{12}$, which is an element that corresponds to the first row and the second column of matrix R. The scaled estimated signal $r_{12}\hat{x}_2$ is then subtracted from the first row of equation (21) (add/subtraction unit 1014). The remaining signal represents the biased estimate of the first spatial data stream, and it is equal to:

$$(r_{11}-\sigma_n p^*_3)x_1+p^*_1 n_1+p^*_2 n_2. \quad (35)$$

If equation (35) is multiplied with the first diagonal element $r_{11}$ of matrix R (unit 1016), then the following equality holds:

$$(r_{11}^2-\sigma_n r_{11} p^*_3)x_1+r_{11}(p^*_1 n_1+p^*_2 n_2)=h_{eff}x_1+n_{eff}. \quad (36)$$

From equation (15) it is true that $r_{11}p_3=\sigma_n$. Then, the effective channel that corresponds to the first spatial stream can be obtained as:

$$h_{eff}=r_{11}^2-\sigma_n r_{11} p^*_3=r_{11}^2-\sigma_n^2. \quad (37)$$

Regarding the variance of the effective noise that corresponds to the first spatial subchannel, since $p_1^2+p_2^2+p_3^2=1$ from equation (14), the following can be derived:

$$\sigma_{n_{eff}}^2 = r_{11}^2\sigma_n^2(p_1^2+p_2^2) = r_{11}^2\sigma_n^2(1-p_3^2) \quad (38)$$
$$= \sigma_n^2(r_{11}^2-r_{11}^2 p_3^2) = \sigma_n^2(r_{11}^2-\sigma_n^2)$$
$$= \sigma_n^2 h_{eff}.$$

Therefore, the unbiased filtered output for the first spatial data stream can be represented as:

$$\tilde{y}_1=h_{eff}x_1+n_{eff}. \quad (39)$$

By using $\tilde{y}_1$, $h_{eff}$ and $n_{eff}$, LLRs of coded bits that are transmitted over the first spatial subchannel (transmitted from the first antenna) can be calculated, and then the decoded first spatial data stream $\hat{x}_1$ can be obtained by the decoder unit 1030.

By applying the unbiased QRMMSE-VBLAST approach, multiple access interference may be further reduced compare to the unbiased QRMMSE detection. On the other side, additional processing latency may be introduced due to a sequential nature of the algorithm.

Figure 7A:
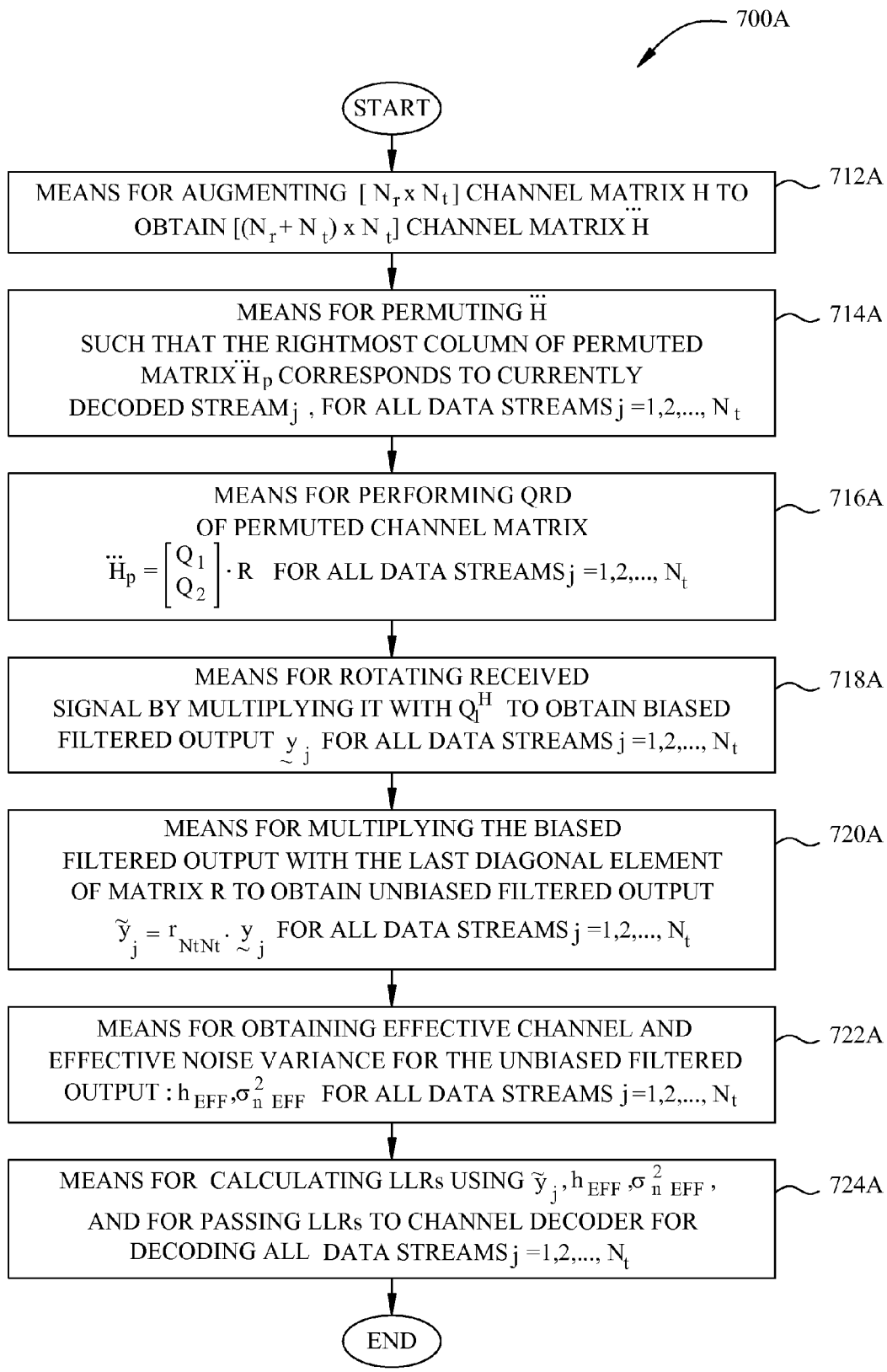
FIG. 7A illustrates example components capable of performing the operations illustrated in FIG. 7.
Figure 9A:
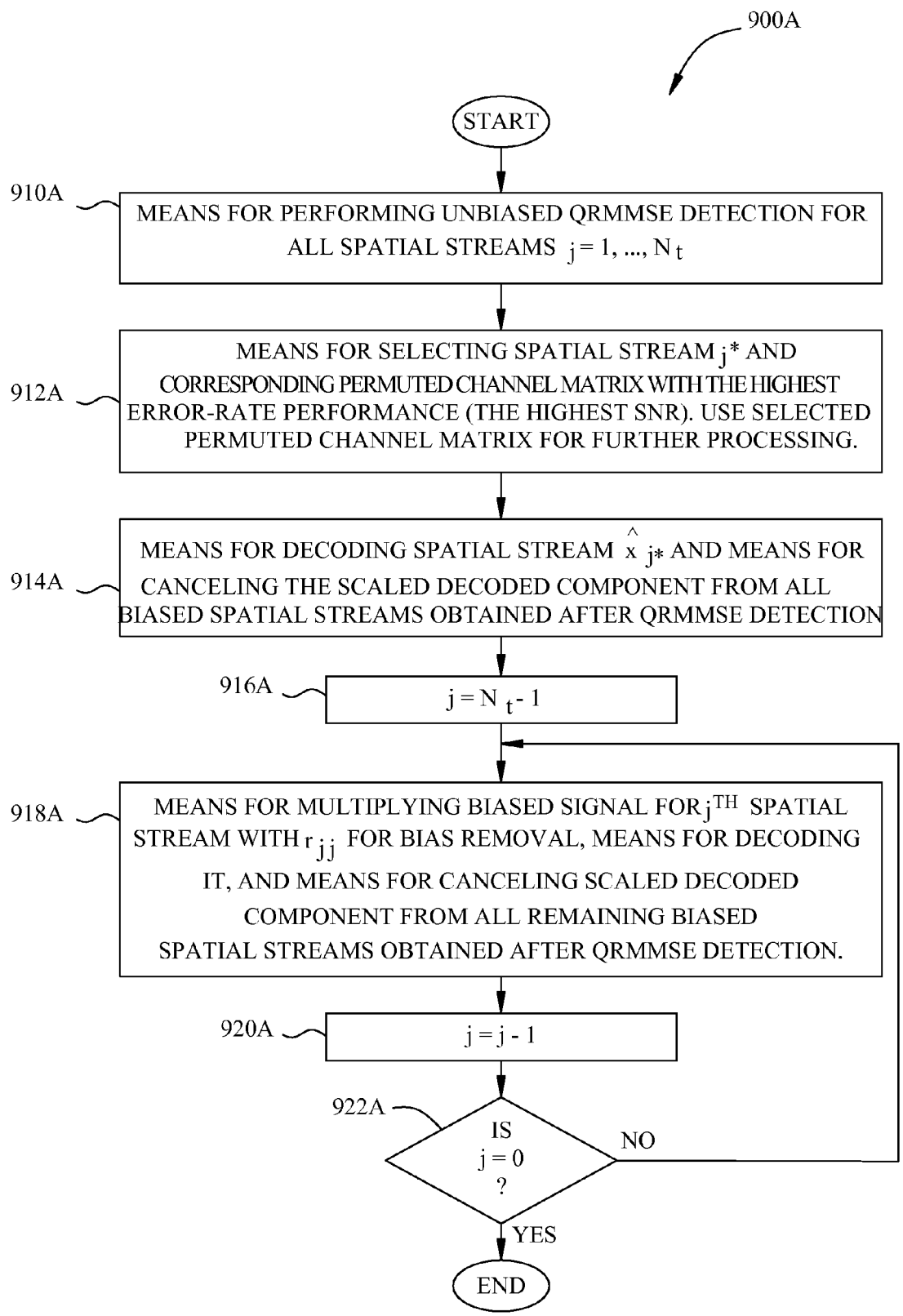
FIG. 9A illustrates example components capable of performing the operations illustrated in FIG. 9.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 712-724 illustrated in FIG. 7 correspond to means-plus-function blocks 712A-724A illustrated in FIG. 7A. Similarly, blocks 912-922 illustrated in FIG. 9 correspond to means-plus-function blocks 912A-922A illustrated in FIG. 9A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method performed by one or more processors for performing bias removal from a received signal obtained after minimum mean square error (MMSE) equalization in a wireless communication system, comprising:
   permuting, performed by the one or more processors, an augmented matrix of channel estimates, for a plurality of spatial streams, to generate permuted augmented matrices of channel estimates for the plurality of spatial streams;
   performing, performed by the one or more processors, QR decomposition of the permuted augmented matrices to generate a unitary matrix and an upper triangular matrix for the plurality of spatial streams;
   rotating, performed by the one or more processors, a received signal of a first one of the spatial streams with a corresponding unitary matrix to generate a biased filtered output for the first spatial stream; and
   multiplying, performed by the one or more processors, the biased filtered output with a diagonal element of a corresponding upper triangular matrix to generate unbiased filtered output for the first spatial data stream.

2. The method of claim 1, further comprising:
   computing, performed by the one or more processors, effective channel estimates for a plurality of spatial sub-channels;
   computing, performed by the one or more processors, effective noise variance for the plurality of spatial sub-channels; and
   calculating, performed by the one or more processors, log-likelihood ratios of coded bits transmitted over the spatial subchannels by using unbiased filtered outputs, effective channel estimates, and effective noise variances.

3. The method of claim 1, further comprising:
   canceling, performed by the one or more processors, the decoded unbiased output for the first spatial stream from biased signals of remaining spatial streams;

sequentially repeating decoding, performed by the one or more processors, a plurality of spatial streams based on bias removal for a plurality of spatial subchannels and canceling the decoded unbiased output from remaining biased spatial streams; and multiplying, performed by the one or more processors, a biased received signal for a remaining spatial subchannel with a diagonal element of the upper triangular matrix to generate an unbiased filtered output for the remaining spatial subchannel.

4. The method of claim 3, further comprising:

computing, performed by the one or more processors, effective estimates for a plurality of spatial subchannels;

computing, performed by the one or more processors, effective noise variance for a plurality of spatial subchannels; and calculating, performed by the one or more processors, log-likelihood ratios of coded bits transmitted over a plurality of spatial subchannels by using corresponding unbiased filtered outputs, effective channel estimates, and variances of effective noise.

5. An apparatus for performing bias removal from a received signal obtained after minimum mean square error (MMSE) equalization in a wireless communication system, comprising:

hardware module for permuting an augmented matrix of channel estimates, for a plurality of spatial streams, to generate permuted augmented matrices of channel estimates for the plurality of spatial streams;

hardware module for performing QR decomposition of the permuted augmented matrices to generate a unitary matrix and an upper triangular matrix for the plurality of spatial streams;

hardware module for rotating a received signal of a first one of the spatial streams with a corresponding unitary matrix to generate a biased filtered output for the first spatial stream; and hardware module for multiplying the biased filtered output with a diagonal element of a corresponding upper triangular matrix to generate unbiased filtered output for the first spatial data stream.

6. The apparatus of claim 5, further comprising:

hardware module for computing effective channel estimates for a plurality of spatial subchannels;

hardware module for computing effective noise variance for the plurality of spatial subchannels; and hardware module for calculating log-likelihood ratios of coded bits transmitted over the spatial subchannels by using unbiased filtered outputs, effective channel estimates, and effective noise variances.

7. The apparatus of claim 5, further comprising:

hardware module for canceling the decoded unbiased output for the first spatial stream from biased signals of remaining spatial streams;

hardware module for sequentially repeating decoding a plurality of spatial streams based on bias removal for a plurality of spatial sub channels and canceling the decoded unbiased output from remaining biased spatial streams; and hardware module for multiplying a biased received signal for a remaining spatial subchannel with a diagonal element of the upper triangular matrix to generate an unbiased filtered output for the remaining spatial subchannel.

8. The apparatus of claim 7, further comprising:

hardware module for computing effective estimates for a plurality of spatial subchannels;

hardware module for computing effective noise variance for a plurality of spatial subchannels; and hardware module for calculating log-likelihood ratios of coded bits transmitted over a plurality of spatial subchannels by using corresponding unbiased filtered outputs, effective channel estimates, and variances of effective noise.

9. An apparatus for performing bias removal from a received signal obtained after minimum mean square error (MMSE) equalization in a wireless communication system, comprising:

means for permuting an augmented matrix of channel estimates, for a plurality of spatial streams, to generate permuted augmented matrices of channel estimates for the plurality of spatial streams;

means for performing QR decomposition of the permuted augmented matrices to generate a unitary matrix and an upper triangular matrix for the plurality of spatial streams;

means for rotating a received signal of a first one of the spatial streams with a corresponding unitary matrix to generate a biased filtered output for the first spatial stream; and means for multiplying the biased filtered output with a diagonal element of a corresponding upper triangular matrix to generate unbiased filtered output for the first spatial data stream.

10. The apparatus of claim 9, further comprising:

means for computing effective channel estimates for a plurality of spatial subchannels;

means for computing effective noise variance for the plurality of spatial subchannels; and means for calculating log-likelihood ratios of coded bits transmitted over the spatial subchannels by using unbiased filtered outputs, effective channel estimates, and effective noise variances.

11. The apparatus of claim 9, further comprising:

means for canceling the decoded unbiased output for the first spatial stream from biased signals of remaining spatial streams;

means for sequentially repeating decoding a plurality of spatial streams based on bias removal for a plurality of spatial sub channels and canceling the decoded unbiased output from remaining biased spatial streams; and means for multiplying a biased received signal for a remaining spatial sub channel with a diagonal element of the upper triangular matrix to generate an unbiased filtered output for the remaining spatial subchannel.

12. The apparatus of claim 11, further comprising:

means for computing effective estimates for a plurality of spatial subchannels;

means for computing effective noise variance for a plurality of spatial subchannels; and means for calculating log-likelihood ratios of coded bits transmitted over a plurality of spatial subchannels by using corresponding unbiased filtered outputs, effective channel estimates, and variances of effective noise.

13. A computer-program product for performing bias removal from a received signal obtained after minimum mean square error (MMSE) equalization in a wireless communication system, comprising a non-transitory computer readable medium having instructions stored thereon, the instructions being executable by one or more processors and the instructions comprising:

instructions, performed by the one or more processors, for permuting an augmented matrix of channel estimates, for a plurality of spatial streams, to generate permuted augmented matrices of channel estimates for the plurality of spatial streams;

instructions, performed by the one or more processors, for performing QR decomposition of the permuted augmented matrices to generate a unitary matrix and an upper triangular matrix for the plurality of spatial streams;

instructions, performed by the one or more processors, for rotating a received signal of a first one of the spatial streams with a corresponding unitary matrix to generate a biased filtered output for the first spatial stream; and instructions, performed by the one or more processors, for multiplying the biased filtered output with a diagonal element of a corresponding upper triangular matrix to generate unbiased filtered output for the first spatial data stream.

14. The computer-program product of claim 13, wherein the instructions further comprising:

instructions, performed by the one or more processors, for computing effective channel estimates for a plurality of spatial subchannels;

instructions, performed by the one or more processors, for computing effective noise variance for the plurality of spatial subchannels; and instructions, performed by the one or more processors, for calculating log-likelihood ratios of coded bits transmitted over the spatial sub channels by using unbiased filtered outputs, effective channel estimates, and effective noise variances.

15. The computer-program product of claim 13, wherein the instructions further comprise:

instructions, performed by the one or more processors, for canceling the decoded unbiased output for the first spatial stream from biased signals of remaining spatial streams;

instructions, performed by the one or more processors, for sequentially repeating decoding a plurality of spatial streams based on bias removal for a plurality of spatial sub channels and canceling the decoded unbiased output from remaining biased spatial streams; and instructions, performed by the one or more processors, for multiplying a biased received signal for a remaining spatial subchannel with a diagonal element of the upper triangular matrix to generate an unbiased filtered output for the remaining spatial subchannel.

16. The computer-program product of claim 15, wherein the instructions further comprise:

instructions, performed by the one or more processors, for computing effective estimates for a plurality of spatial subchannels;

instructions, performed by the one or more processors, for computing effective noise variance for a plurality of spatial subchannels; and instructions, performed by the one or more processors, for calculating log-likelihood ratios of coded bits transmitted over a plurality of spatial subchannels by using corresponding unbiased filtered outputs, effective channel estimates, and variances of effective noise.

* * * * *